United States Patent [19]

Hamilton et al.

[11] Patent Number: 5,802,484

[45] Date of Patent: Sep. 1, 1998

[54] ADAPTIVE ANTENNA STRUCTURE FOR A COMPUTATIONAL DEVICE

[75] Inventors: Douglas M. Hamilton, Elgin; Allen L. Davidson, Crystal Lake; Mark A. Gannon, Sleepy Hollow; Leigh M. Chinitz, Palatine; Roger J. B. Jellicoe, Woodstock, all of Ill.

[73] Assignee: Motorola, Inc., Schaumburg, Ill.

[21] Appl. No.: 678,899

[22] Filed: Jul. 12, 1996

[51] Int. Cl.⁶ ............................................. H04B 1/38
[52] U.S. Cl. ....................... 455/558; 455/283; 455/296
[58] Field of Search .............................. 455/550, 557, 455/558, 296, 283, 284, 276, 272, 273, 275, 303, 304; 343/702, 853, 700

[56] References Cited

U.S. PATENT DOCUMENTS 4,301,432  11/1981  Carlson et al. ...................... 333/164

*Primary Examiner*—Nguyen Vo
*Assistant Examiner*—Marsha D. Banks-Harold
*Attorney, Agent, or Firm*—M. Mansour Ghomeshi

[57] ABSTRACT

An antenna structure (108) operates in the presence of narrow or wide band interference and yet is able to enjoy high receiver sensitivity. This is done by steering the antenna structure (108) radiation pattern null in its near field at the noise source.

14 Claims, 4 Drawing Sheets

ADAPTIVE ANTENNA STRUCTURE FOR A COMPUTATIONAL DEVICE

TECHNICAL FIELD

This invention is generally related to computational devices and particularly those having a radio communication device.

BACKGROUND

Portable electronic devices such as notebook computers, radio frequency (RF) data terminals, and personal digital assistants (PDA's) produce electromagnetic interferences (EMI). EMI is generally caused by emissions from internal electrical signals generated by such components as clock sources, switching power sources, and randomly switching digital logic. These emissions have spectral components in the frequency bands used for radio frequency data transmission and therefore cause interference therewith. These spectral components create interference and may be wide band or narrow band. Narrow band interference spectral components are contained within the bandwidth of the Intermediate Frequency (IF) of the receiving device, whereas wideband interference has spectral energy exceeding the bandwidth of the IF of the receiving device. The frequency and amplitude of the interference varies depending on the state of the computing device. When a radio frequency RF data modem is connected to a portable computing device, the receiver is in close proximity to the computer, and hence is susceptible to interference generated by the computing device. Some designers have used a shift in the Intermediate Frequency (IF) to overcome this problem. However, because the radiated EMI interference may be located in the radio frequency band used for wireless data reception, this technique will not avoid interference. Another solution to this problem has been to alter (warp) the computer's clock frequencies to move the narrow band interference out of the receive frequency range. However, the solution lacks general applicability as it is typically not possible for the radio device to control the clock frequencies of the portable electronic device.

Another possible solution is for the receiver to be assigned a new frequency once the interference corruption of the original channel is detected. This method may not be practical during high system loading periods or when channels available for data are otherwise limited. Yet another method to alleviate the effect of this interference is to apply a filter at the receiver and notch out the narrow band interferer. However, narrowband interference only affects a small percentage of the communication channels. Wideband interference covers a greater percentage of the communication channels, and the previously cited possible solutions only are effective against narrow band interference. Thus, the RF data modem may be required to deal with strong narrow or wide band interference within its received signal which can not easily be eliminated by conventional methods.

Other known means to reduce narrowband interference include a notch filter with a center frequency determined before the start of the desired message. Bench measurements have shown however, that the interference frequency varies significantly with time, temperature, and power supply voltage, particularly within a portable computing device. Common user actions such as plugging in an external cathode ray tube (CRT), connecting to an external power supply, disk activity, or closing the display to conserve battery power can abruptly shift the amplitude and frequency of a narrow band interferer. The bandwidth of the notch is required to be narrow to prevent absorption of a significant amount of desired signal energy. The shifts in frequency are quite frequently many times the allowable notch bandwidth. Thus, the center frequency of the notch cannot remain fixed.

As a result, designers use adaptive notch filters, which, however, are not problem free. The nature of the EMI narrowband interference canceling problem precludes the use of a simple adaptive notch filter, e.g., depending on the type of modulation used. For example, pilot symbol assisted modulation is a well-known technique for carrier recovery in which known symbols are inserted into the transmitted signal at regular intervals. Synchronization symbols may also be inserted into a transmitted signal to provide timing recovery information. Desired signals that incorporate periodically repeating components, such as synchronization and pilot symbols, may not be adaptively canceled by a classic adaptive notch filter. Such canceling depends on the amplitude of the narrowband interference relative to the desired signal strength and results in the loss of timing or carrier recovery information.

In addition, no notch filter can be effective if the energy in the interference is spread in frequency across the receiver passband (i.e., wide band interference). Wide band interference can be reduced by shielding the computing device from the receiving antenna. This proves difficult as computer devices are not required to have shielding in excess of FCC Part 15 regulations.

Physically separating the antenna of the receiver by some distance from the computing device is another means of reducing the effects of interference. Every doubling of distance reduces the interference power by 6 dB. The problem with this approach is that it would remove the ability to have the antenna integrated into the receiving device.

Accordingly, there is a need for a method to reduce both narrow band and wide band interference in a computational device.

DETAILED DESCRIPTION OF THE PREFERRED EMBODIMENTS

Receivers intended for use with computers suffer greatly from interferences generated by the computer. To avoid the undesirable effects of computer emissions on such receivers, the present invention utilizes a steerable antenna structure. The radiation pattern of this antenna, which includes multiple elements, is steered in such a way to force the null in its near field at the noise source. As a result, this antenna structure can operate in the presence of narrow or wide band interference and yet be able to enjoy high receiver sensitivity.

Figure 1:
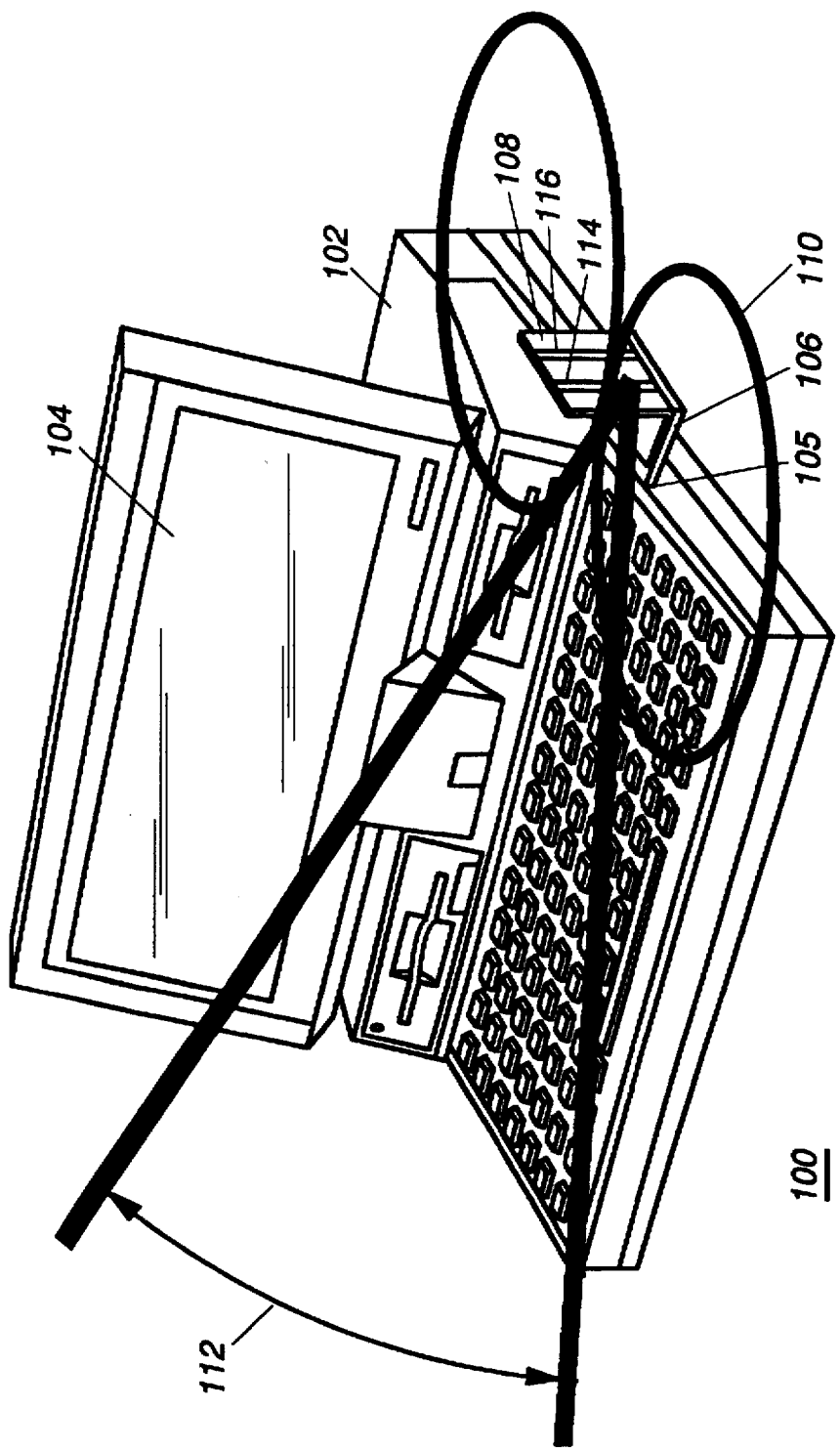
FIG. 1 is a computer system in accordance with the present invention.

Referring to FIG. 1, there is shown a computer system 100 in accordance with the present invention. The computer system 100 comprises computer 102 which stores user information and a monitor 104 to display the user's information. The communication system 100, such as a portable computer, includes a data connection port 105 to which external component may be attached. The data connection port 105 is provided to accommodate a radio frequency communication device 106. The radio frequency communication device 106 is positioned close to the computer system 100. In the preferred embodiment, the radio frequency communication device 106 is an extended Personal Computer Memory Card Industry Association (PCMCIA) card. The function of the radio frequency communication device 106 is to provide communication, via a receiver, between an external communication device and the computer 102. The radio frequency communication device 106 comprises an antenna structure 108 coupled to the receiver. The antenna structure 108 includes a main element 114 and an auxiliary element 116. Those two elements 114 and 116 are strategically phased to substantially limit the effects of computer emissions of the integrity of the received signal. As is known to those skilled in the art, the radiation pattern 110 of antenna structure 108 will have nulls in its radiation pattern, because it comprises more than one radiating element, in this case, elements 114 and 116. In the present invention, elements 114 and 116 are phased to limit the effects of Electromagnetic Interference (EMI). By phasing elements 114 and 116 correctly, the preferred angle of the radiation pattern null of the antenna structure 108 as represented by 112 is directed toward the computer 102. This angle allows the radiation pattern null from the antenna structure 108 to be aimed directly at the interference source. The result of such steering is a reduction in the degradation of the received radio frequency signal due to the radiating computer emissions.

In short, the antenna structure 108 can operate in the presence of narrow or wide band interference and yet be able to enjoy high receiver sensitivity. This is done by steering the antenna structure 108 radiation pattern null in its near field at the noise source. Furthermore, recovery occurs of desired signals which have periodically repeating components. This is a significant advantage over the prior art which could fail to achieve proper timing or recovery of information in signals having periodically repeating components. Another advantage is that the system of the present invention no longer requires the EMI to be narrow in frequency content relative to the signal desired to be received.

Figure 2:
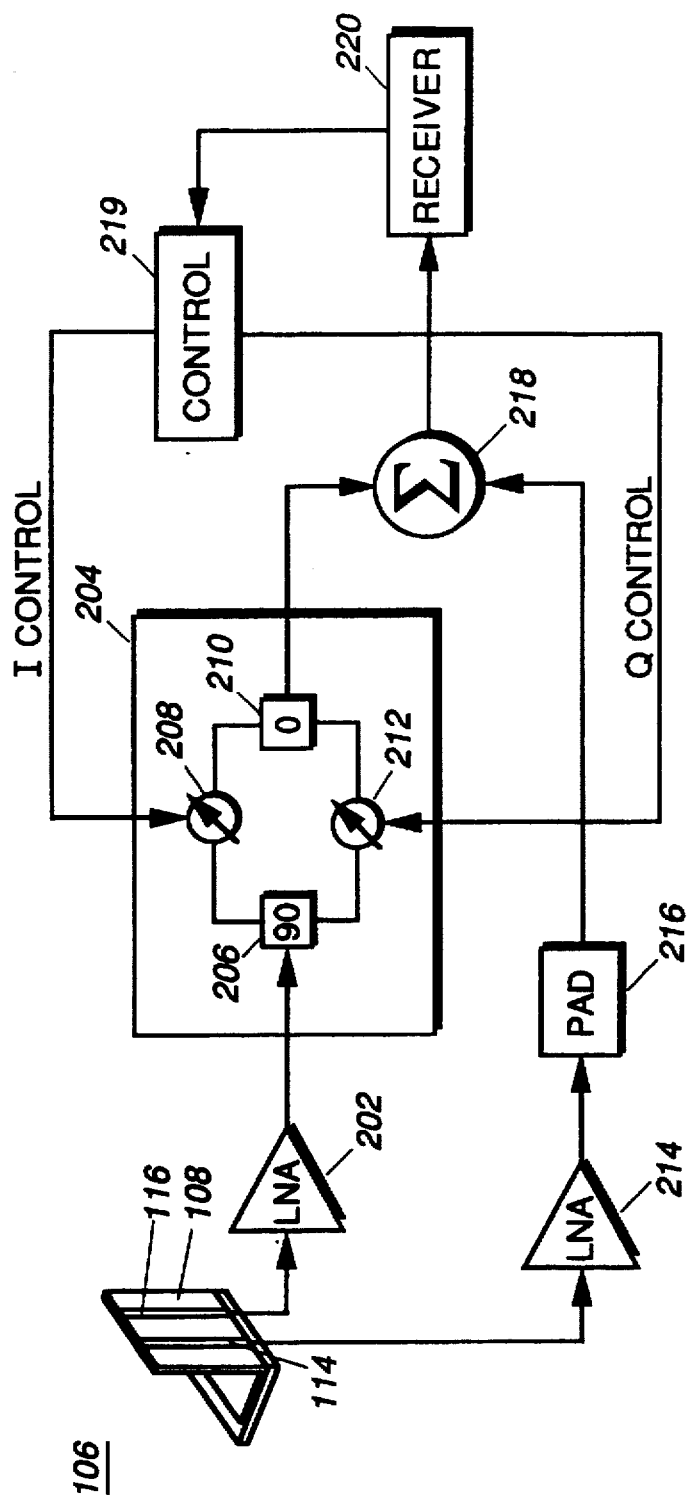
FIG. 2 is a block diagram of a communication device in accordance with the present invention.

Referring to FIG. 2, a block diagram of relevant sections of a PCMCIA card 106, in accordance with the present invention, is shown. The main element 114 of the antenna receives both a radio frequency signal and at least one undesired radio frequency signal (interference). These two received signals are then fed from the main element 114 through the low-noise amplifier (LNA) 214 to compensate for any losses that may have resulted. An adjustable pad 216 is provided to attenuate the level of the signals at the output of the amplifier 214 in order to match the amplitude of the interference in the auxiliary and main signal paths. This adjustable pad 216 may be eliminated depending on the gains and losses of the other components in PCMCIA card 106. The auxiliary element 116 is coupled to an LNA 202 where signals received thereon are amplified. The auxiliary element 116 is similar to the main element 114, except that the two antennas are spatially separated.

An electronic phasing device, such as a complex weighter 204, is coupled to the output of the LNA 202. A description of a complex weighter's operation can be found in U.S. Pat. No. 4,301,432, "Complex RF Weighter." The complex weighter 204 includes a signal split and 90° phase shift 206, an in-phase bi-phase amplitude control (I control) 208, a signal combiner and 0 degree phase shift 210, and a quadrature-phase bi-phase amplitude control (Q control) 212.

The control signals for I control 208 and Q control 212 are generated external to the complex weighter 204. In the preferred embodiment, these control signals are generated by a digital-to-analog (D/A) converter within weighter control apparatus 219, with one D/A for I control 208 and one D/A for Q control 212. The control signals may be adaptive. For adaptive adjustment of I control 208 and Q control 212, the weighter control apparatus 219 monitors outputs of receiver 220. These outputs are used to determine the quality of the of the signal input to receiver 220, such as the received signal to noise ratio or the recovered bit error rate of the received signal. The weighter control apparatus 219 then adjusts the I control 208 and Q control 212 signals via an algorithm implemented in software to adaptively optimize the signal quality. The following paragraphs explain how using these control signals can optimize the received signal quality.

As signals pass through the complex weighter 204, the phase and amplitude of the desired signal and at least one of the undesired radio frequency signals are varied. The signals from the I 208 and Q 212 signal paths are summed by the 0 degree phase shift signal combiner 210 and travel to the summer 218. At this point, the signals from the Pad 216 and the I 208 and Q 212 paths are combined at a summer 218.

In the general case, the relative phase of the desired and undesired signals is different in the main and auxiliary signal paths, due to the differing distances of the signal sources to each antenna element. If the undesired radio signal is adjusted to be out of phase in the auxiliary path relative to the main path, the undesired signal will cancel, and an improvement in signal to interference ratio will result.

In essence, the complex weighter 204 functions as a variable phase and amplitude network. By adjusting the phase of a desired signal and that of at least one undesired signal received by the auxiliary element 116 relative to the desired signal and the at least one undesired signal received by the main element 114, the spatial direction of the radiation pattern null of antenna structure 108 is changed. Therefore, there is a range of control settings on the I208 and Q212 signal paths of complex weighter 204 that will produce a reduction in the narrow band or wide band interference at receiver 220. For example, if the complex weighter 204 controls are set such that no signal is available at the output of the complex weighter 204, then the interference is not decreased. However, if the control setting is such as to steer the radiation pattern null 110 of antenna structure 108 towards computer 102, then the interference is noticeably reduced.

In the present invention, with the desired signal set at 859.1375 MHz, and the complex weighter 204 set such that no signal is output of complex weighter 204, then the desired signal as received by antenna structure 108 needs to be approximately −79 dBm for near error free reception. Once the complex weighter 204 is set properly, the desired signal as received by antenna structure 108 needs to be approximately −99 dBm for near error free reception. This is an improvement of 20 dB.

Figure 3:
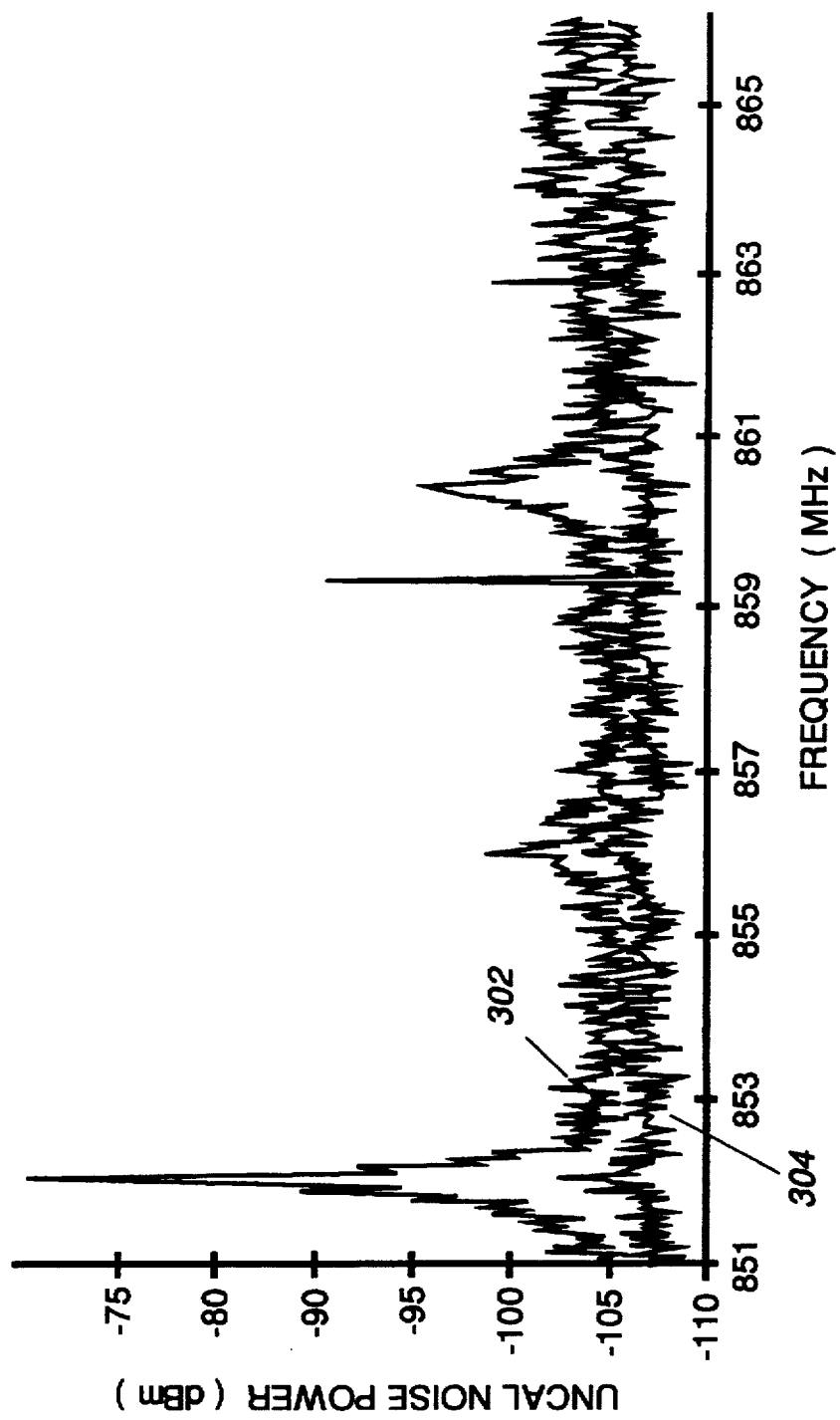
FIG. 3 shows a graphical representation of the operational improvement of the preferred embodiment.

The principles of the present invention are made clearer by referring to FIG. 3 where two waveforms of the received signal at the receiver 220 are shown. The waveform 302 indicates the radio frequency signal of the undesired computer-generated interference received at receiver 220 without the benefit of a complex weighter 204, i.e., the complex weighter 204 is not set. This waveform is greater in magnitude than the desired signal by as much as 25 dB for narrowband interference and as much as 20 dB for broadband interference. Once the complex weighter 204 is set properly, the interference is reduced, and the result is shown in waveform 304. As can be seen by waveform 304, the receiver sensitivity is recovered to near optimal performance with the modulator 204 set, even where large EMI exists. The received [S/(N+I)] ratio can be maximized by adjusting the I control 208 and Q control 212. Adjustment of these controls may be performed one time at installation or dynamically during operation.

Figure 4:
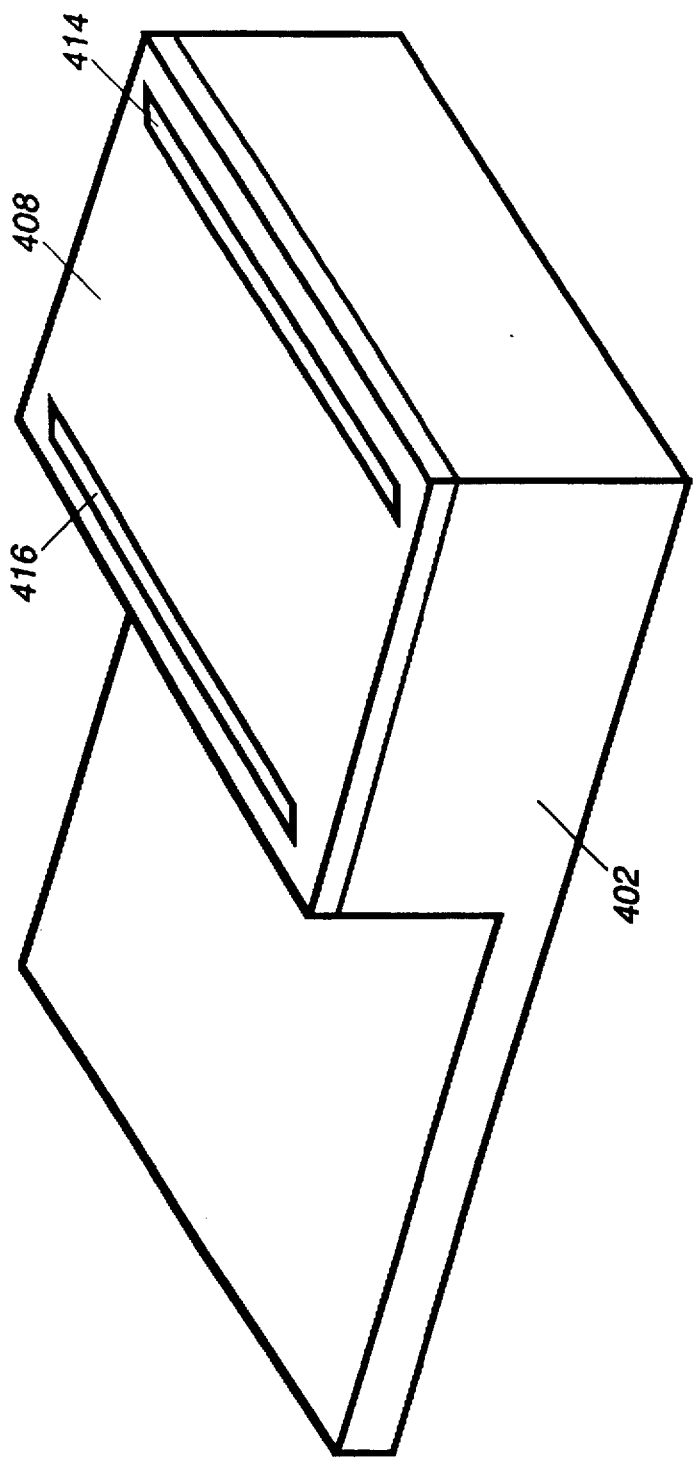
FIG. 4 shows an alternative embodiment of a communication device in accordance with the present invention.

Referring to FIG. 4, an alternative embodiment of the PCMCIA card 400 is shown in accordance with the present invention. The PCMCIA card includes a battery 402 which connects to the data communication port 108. A high dielectric cavity 408 rests upon battery 402. The high dielectric cavity includes two slot antennas 414 and 416.

Although the antenna orientation is significant to the proper operation of the radio communication device of the present invention several structures may be used to accomplish this operational objective. The two elements of the antenna structure may be substantially similar or very different. Of concern is their operation relative to each other in creating a null directed at interferences caused by computer emissions. The presentation of the preferred embodiments in this document is meant to provide the reader with particular designs and is not intended to imply limitations to the invention. Numerous modifications, changes, variations, substitutions, and equivalents will occur to those skilled in the art without departing from the spirit and scope of the present invention as defined by the appended claims.

What is claimed is:

1. A computational device, comprising:
   a computer having a data connection port and radiating computer emissions;
   a radio frequency communication device located in close proximity of the computer and connected to the data connection port for communication thereto, the communication device including:
   a receiver; and
   an antenna structure coupled to the receiver for receiving and coupling thereto a radio frequency signal, the antenna structure, comprising:
   a plurality of receiving elements structured to have a radiation pattern null and strategically phased to aim the null at the computer emissions in order to substantially limit the effects of computer emissions on the integrity of the received signal.

2. The computer system of claim 1, wherein the radio frequency communication device comprises a Personal Computer Memory Card Industry Association (PCMCIA) card.

3. The computer system of claim 1, wherein the antenna structure includes a main element.

4. The computer system of claim 3, wherein the antenna structure includes an auxiliary element.

5. The computer system of claim 4, wherein the main and the auxiliary antennas are substantially identical to each other.

6. The computer system of claim 4, wherein the main and the auxiliary antennas are substantially different from each other.

7. The computer system of claim 4, wherein the auxiliary element is electrically connected to the computer.

8. The computer system of claim 1, wherein the computer is a portable computer.

9. A computer system, comprising:
   a computer having a data connection port for accommodating accessories, the computer radiating undesired emissions;
   a radio frequency communication device coupled to the data connection port for providing radio frequency communication between an external communication device and the computer, the radio frequency communication device comprising:
   an antenna structure having a radiation pattern null, including:
   a main element for receiving a desired radio frequency signal and at least one undesired radio frequency signal;
   an auxiliary element for receiving the desired radio frequency signal and the at least one undesired radio frequency signal; and
   an electronic phasing device coupled to the auxiliary element to aim the null at the undesired emissions in order to substantially alter the phase of both the desired and the at least one undesired radio frequency signals; and
   a summer for summing the output of the electronic phasing device and the main element for substantially limiting the effects of the undesired radio frequency signal on the receiver.

10. The computer system of claim 9, wherein the computer is a portable computer.

11. In a computer system having a communication device attached to a computer, the communication device having an antenna structure having a radiation pattern null and a main element and an auxiliary element, a method for minimizing the effects of computer generated noise on the communication device comprising:
   receiving a desired radio frequency signal and at least one additional undesired radio frequency signal via the main antenna;
   receiving the desired radio frequency signal and the at least one additional undesired radio frequency signal via one or more of the auxiliary antennas;
   manipulating the signal received at the auxiliary antenna via a phase conditioner by aiming the null at the computer generated noise; and
   summing the manipulated signal from the auxiliary antenna with the signal from the main antenna in order to minimize the effects of the computer generated noise on the receiver.

12. The computer generated noise minimization method of claim 11, wherein the signal quality of the summed signals is monitored.

13. The computer generated noise minimization method of claim 12, wherein a software algorithm is employed to adjust the phase and amplitude of the auxiliary channel to optimize the signal quality of the monitored summed signals.

14. The computer generated noise minimization method of claim 11, wherein a software algorithm is employed to adjust the phase and amplitude of the auxiliary channel to optimize the signal quality.

* * * * *